United States Patent [19]

Seltzer et al.

[11] 3,943,107

[45] Mar. 9, 1976

[54] PROCESSABLE HIGH TEMPERATURE POLYMERS PREPARED FROM AMINE TERMINATED POLYMERS AND CYANAMIDES OF POLYFUNCTIONAL SECONDARY AMINES

[75] Inventors: Raymond Seltzer, New City; Paul D. Sherman, Shrub Oak, both of N.Y.

[73] Assignee: Ciba-Geigy Corporation, Ardsley, N.Y.

[22] Filed: Jan. 4, 1974

[21] Appl. No.: 430,967

[52] U.S. Cl. ............... 260/65; 427/340; 428/474; 260/30.2; 260/32.6 N; 260/47 R; 260/49; 260/52; 260/63 N; 260/78 TF; 260/78 SC; 260/78.4 N; 260/79; 260/79.3 M; 260/838; 260/857 R
[51] Int. Cl.² ............... C08G 73/10; C08G 73/14; C08G 73/18; C08G 73/20
[58] Field of Search .......... 260/47 R, 78 TF, 78 SC, 260/78.9 N, 65, 79, 49, 79.3 M, 63 N, 52, 838, 857 R

[56] References Cited
UNITED STATES PATENTS

| | | | |
|---|---|---|---|
| 3,436,372 | 4/1969 | Hoegger | 260/65 |
| 3,488,742 | 1/1970 | Blekicki et al. | 260/830 |
| 3,513,134 | 5/1970 | Filius | 260/78 |
| 3,642,725 | 2/1972 | Schminke et al. | 260/78.4 |
| 3,817,920 | 6/1974 | Langager | 260/47 |

*Primary Examiner*—Lester L. Lee
*Attorney, Agent, or Firm*—Nestor W. Shust; Charles W. Vanecek

[57] ABSTRACT

This invention provides compositions containing amine terminated high temperature prepolymers such as polyimides, polyamide-imides or the corresponding polyamide-acids in combination with cyanamides of polyfunctional secondary amines and the crosslinked polymers obtained therefrom. These cyanamides are reactive fluxes which facilitate processing of the high temperature prepolymer resin by lowering the softening temperature under processing conditions, and they also chain-extend and cross-link the prepolymer resin.

21 Claims, No Drawings

PROCESSABLE HIGH TEMPERATURE POLYMERS PREPARED FROM AMINE TERMINATED POLYMERS AND CYANAMIDES OF POLYFUNCTIONAL SECONDARY AMINES

This invention relates to a new means for processing high temperature resins which enables use of relatively low processing temperatures. It relates further to the preparation of highly crosslinked high temperature stable polymers by curing an amine terminated prepolymer with a cyanamide of a polyfunctional secondary amine.

High temperature resins in the form of molding powders, laminating resins, adhesives and coatings are used in the fabrication of articles which may be subjected to temperatures as high as 400°–500°C. such as insulating coatings for electric motors, printed circuit substrates, pressure sensitive tapes, and transformer and capacitor insulation. These materials are high melting or infusable and generally resistant to most solvents. Thus, they are difficult to process, high temperatures and pressures being required.

Many of these resins have precursor or prepolymer forms which are lower melting. For example, polyamides can be formed from polyamic acids, polyamide-imides from polyamide amide acids, polybenzimidazoles from polyamide amines, etc. These precursors, while suitable for the preparation of thin films, cannot be handled by pressure molding techniques without great difficulty since they undergo cyclization yielding water which gives rise to poorly consolidated and void filled products of low mechanical strength.

It is an object of this invention to provide a class of precursor polymers or "prepolymers" which are capable of being processed at relatively low temperatures to yield highly crosslinked, chain-extended high temperature polymers.

It is a further object of this invention to provide a class of reactive fluxes which can be employed as processing aids for such prepolymers.

It is an additional object of the invention to provide new and useful highly crosslinked, chain extended high temperature polymers.

Other objects will be apparent from the ensuing description of this invention.

It has now been found, that cyanamides of polyfunctional secondary amines are reactive fluxes with amine terminated prepolymers and that it is possible to process these materials using conventional plastic processing techniques, such as autoclave and vacuum bag laminating, and compression and injecting molding. These fluxes while lowering the softening temperature of the prepolymers, also chain-extend and cross-link them to give useful objects which possess good mechanical and thermooxidative properties as well as low void content. In certain cases it may be desirable to postcure the object under unrestrained conditions from r.t. (25°C) to 350°C. to maximize mechanical and thermooxidative properties.

The number of equivalents of cyanamide groups is 0.5 to 5, preferably 0.5 to 3 and most preferably is equal to or greater than the number of equivalents of amine groups in the amine terminated precursor polymer.

The cyanamide polyfunctional secondary amines used in this invention can be represented by the following general formula (I):

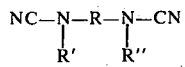

In this formula, R may represent an alkylene; a heterocyclic group; or an arylene radical as well as two and more radicals of this type, which may be linked by arylene or alkylene radicals or by hetero atoms. When using cyanamides of a higher valence than bivalence, the radical R may contain further radicals.

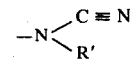

R' and R'' may be alkyl; aralkyl; aryl; alkaryl or heterocyclic radicals, and together with —N—R—N—, may also form part of a heterocyclic system.

Examples of alkylene radicals are straight-chain or branched, saturated or unsaturated, optionaly cyclic aliphatic hydrocarbon radicals such as isohexylene, ethylene, isobutylene, propylene, butylene, pentylene, hexylene, decylene, octadecylene, cyclohexylene, cyclopentylene; as arylene radicals there may be mentioned by way of example phenylene, naphthylene, (poly)chlorophenylene, (poly)nitrophenylene, (poly)methylphenylene, (poly)chloronaphthylene, (poly)nitronaphthylene. An example of two alkylene radicals which are linked by an arylene radical, is the radical —$CH_2$—$C_6H_4$—$CH_2$; a example of two arylene radicals linked by an alkylene radical is the grouping $C_6H_4$—$C(CH_3)_2$—$C_6H_4$—. Arylene and alkylene radicals which are linked by heteroatoms include the diphenyloxide, diphenylsulfide or diphenylsulfone groupings as well as corresponding aliphatic groupings.

As alkyl radicals there can be used for example straight-chain or branched, saturated or unsaturated, optionally cyclic aliphatic hydrocarbons having up to 20 cabon atoms.

Examples of heterocyclic radicals are s-triazinyl, pyridyl and triazolyl.

Examples of aralkyl radicals are the benzyl, phenylethyl, phenylpropyl radical. As a system wherein R' and R'' together with —N—R—N form a heterocyclic ring system, there may be mentioned for example the piperazine ring.

As polyvalent cyanamides there can be used e.g. the bis-cyanamides of the following diamines: N,N'-dimethylethylenediamine, N,N'-diethyl-, N,N'-di-n- or isopropyl-, N,N'-di-n- or -iso- or -tert.-butyl, N,N-dihexyl-, N,N'-dicyclohexyl-, N,N'-diphenyl, N,N'-di-dodecyl-, N,N'-di-octadecyl-, N,N'dibenzyl, N,N'-diallyl-, N,N'-dipropargylethylenediamine, as well as the correspondingly substituted propylenediamines, butylenediamines, buteneylenediamines, butinylenediamines, hexamethylenediamines, decamethylenediamines, octadecamethylenediamines, phenylenediamines-(1,2) or -(1,3) or -(1,4), naphthylenediamines-(1,2) or -(1,3) or -(1,4) or -(1,5) or -(1,6) or -(1,7) or -(1,8) or -(2,3) or -(2,4) or -(2,6) or -(2,7)-bis-methylaminobenzenes, 4,4'-bis (aminophenyl)methanes, 4,4'-bis(aminophenyl)ethanes- (1,1) and -(1,2), 4,4'-bis(aminophenyl)ethylenes-(1,2), 4,4'-bis(aminophenyl)propanes-(1,3) or -(2,2), 4,4'-bis(aminophenyl)oxides, 4,4'-bis(aminophenyl)-sulfides or -sulfones; furthermore, piperazine and N-methyl-$\beta$-amino-ethylepiperazine.

Besides, there can also be e.g. the polycyanamides of N,N',N''-tris-N-alkyl-tris-amino-triphenylmethane, N,N',N''-tris-N-aralkyl-tris-amino-triphenylmethane, N,N',N''-tris-N-alkyl-tris-amino-triphenylphosphates and -thiophosphates and the N,N',N''-tris-N-aralkyl-tris-amino-triphenylphosphates and thiophosphates, tris-arylamino-s-triazines, tris-alkylamino-s-triazines, tris-alkarylamino-s-triazines, tris-aralkylamino-s-triazines.

It can be seen that the nature of R in the cyanamide fluxes is not critical and any compound having at least two, preferably 2–3 cyanamide groups free of reactive hydrogens may be employed in this invention.

The cyanamides of polyfunctional secondary amines of formula I are prepared by known synthetic methods, as, for example, by the reaction of cyanogen bromide with a secondary diamino compound in the presence of a basic catalyst.

Amine terminated precursor polymers useful in the present invention are polymers which have thermally stable recurring units or groups convertible thereto; and terminal primary amino groups. Such thermally stable recurring units should be stable above about 250°C. and are found in polyamide-imides, polyimides, polybenzimidazles, polypyrrones, polythiadiazoles, polyquinoxalines, polybenzothiazoles, polyarylsulfones, polyphenylenesulfides, etc. The amine termination may be imparted to such polymers or their precursors in a variety of ways, the choice of which way being dependent upon the reactivity of the terminal group inherently found on the polymer or precursor. Several ways will be illustrated below.

The amine terminated base resins which may be amide-imide resins, imide resins and precursors of these resins processed in the presence of the cyanamide fluxes include a polyamide-acid of the formula (II):

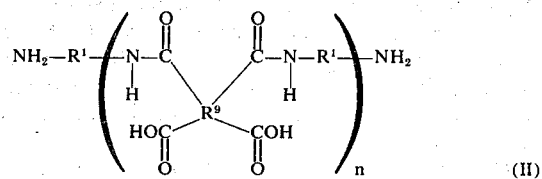

(II)

and its corresponding polyimide of the formula (III):

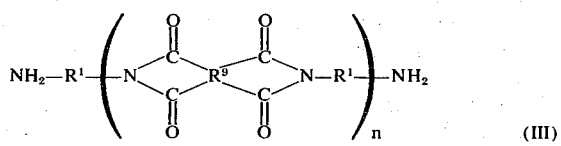

(III)

as well as polyamide-amide acids of the formulae (IV) and (V):

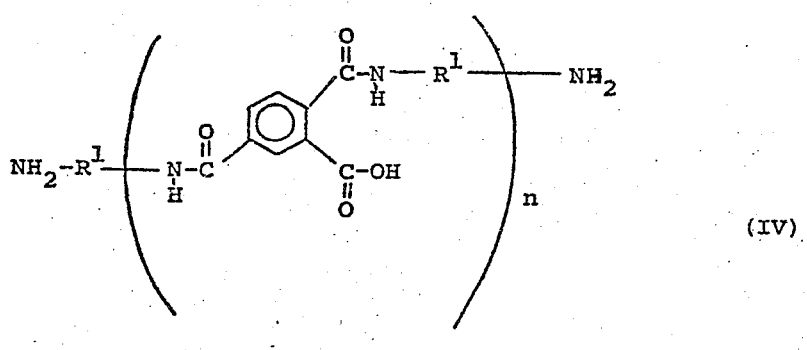

(IV)

and

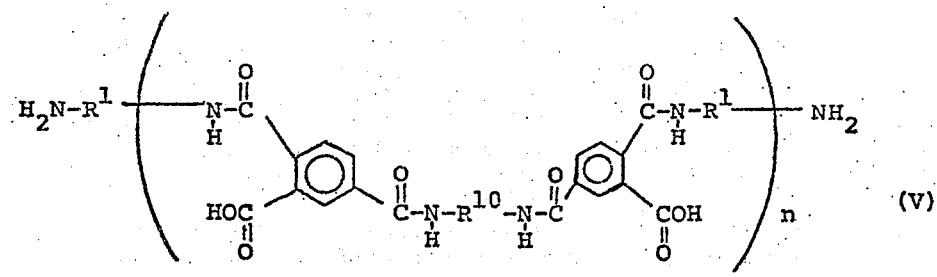

(V)

and their respective corresponding polyamide-imides of the formulae (VI) and (VII):

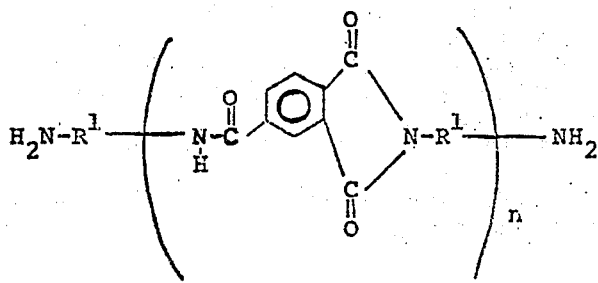

(VI)

and

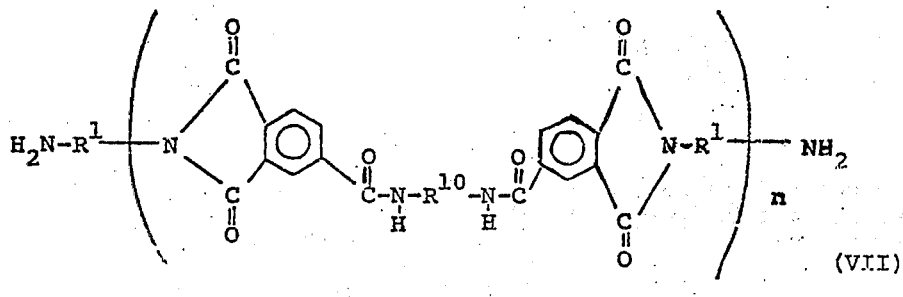

(VII)

wherein

R¹ is a divalent arylene, alkylene or heterocyclic radical as defined in R above;

R⁹ is a tetravalent aliphatic, cycloaliphatic, aromatic or heterocyclic radical containing at least 2 carbon atoms;

R¹⁰ is a divalent organic radical of the scope defined by R¹.

n is an integer of from 1 to 100 and more preferably from 1 to 15, most preferably from 1 to 10.

Compounds of formulae II–VII are derivable from the reaction of anhydrides and primary amines.

More particularly, R⁹ is derived from a dianhydride characterized by the general formula (VIII):

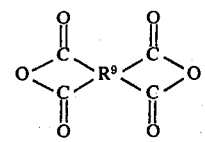

(VIII)

R⁹ may be a straight or branched chain saturated aliphatic radical having from 2 to 4 carbon atoms, a saturated alicyclic radical having 5 to 12 carbon atoms in the ring, a heterocyclic radical containing at least one of the atoms of O, N and S, and an aromatic group containing at least one ring of six carbon atoms, the four carbonyl groups being attached directly to separate carbon atoms in a six membered benzenoid ring of the R⁹ ring each pair of carbonyl groups being attached to adjacent carbon atoms in a ring of the R⁹ radical. Exemplary aromatic groups may be characterized by the following structures:

 , 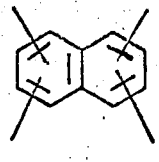 , 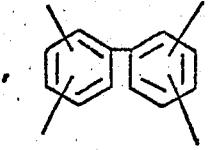 ,

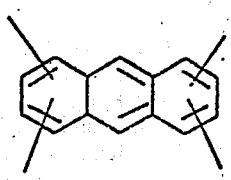 , 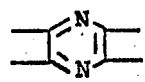 , 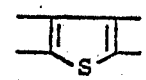 ,

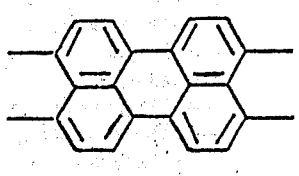 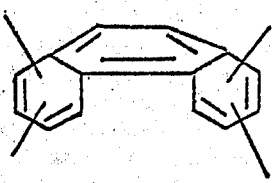

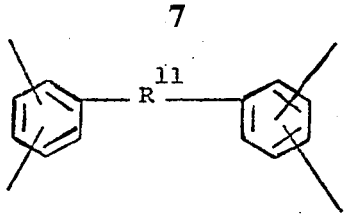

wherein $R^1$ is selected from the group consisting of

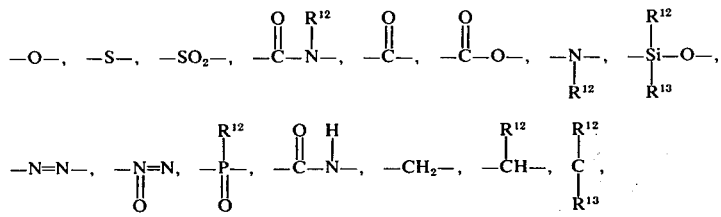 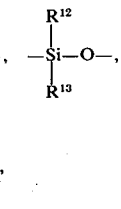

wherein $R^{12}$ and $R^{13}$ are alkyl of from 1 to 6 carbon atoms or aryl such as phenyl and substituted groups thereof, and radicals having the structure

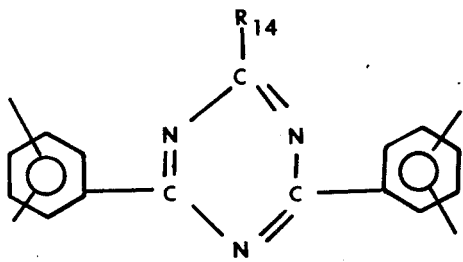

wherein $R^{14}$ is hydrogen, aryl such as phenyl and naphthyl, hydroxyl, amino, diarylamino such as diphenylamino, dialkylamino such as dimethyl or diethylamino and the like. These latter type triazine based dianhydrides are described in greater detail in an application filed on May 1, 1972, Ser. No. 248,838.

In these dianhydrides every carbonyl group is attached directly to a separate carbon atom of the aromatic radical the carbonyl groups being ortho or peri to each other so that 5- or 6- membered anhydride rings are formed respectively.

The preferred aromatic dianhydrides are those in which the carbon atoms of each pair of carbonyl groups are directly attached to ortho carbon atoms in the $R^9$ group to provide a 5membered ring as follows:

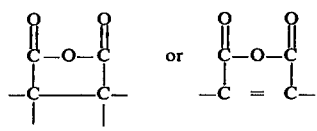

Suitable dianhydrides that are used alone or in a mixture are, among others:
Pyromellitic dianydride
2,3,6,7-Naphthalenetetracarboxylic dianhydride
3,3',4,4'-Diphenyltetracarboxylic dianhydride
1,2,5,6-Naphthalenetetracarboxylic dianhydride
2,2',3,3'-Diphenyltetracarboxylic dianhydride
2,2-Bis-(3,4-dicarboxyphenyl)propane dianhydride
Bis-(3,4-dicarboxyphenyl)sulfone dianhydride
3,4,9,10-Perylenetetracarboxylic dianhydride
Bis-(3,4-dicarboxyphenyl)ether dianhydride
Ethylenetetracarboxylic dianhydride
Naphthalene-1,2,4,5-tetracarboxylic dianhydride
Naphthalene-1,4,5,8-tetracarboxylic dianhydride
Decahydronaphthalene-1,4,5,8 tetracarboxylic dianhydride
4,8-Dimethyl-1,2,3,5,6,7-hexahydronaphthalene-1,2,5,6-tetracarboxylic dianhydride
2,6-Dichloronaphthalene-1,4,5,8-tetracarboxylic dianhydride
2,7-Dichloronaphthalene-1,4,5,8-tetracarboxylic dianhydride
2,3,6,7-tetrachloronaphthalene-1,4,6,8-tetracarboxylic dianhydride
Phenanthrene-1,8,9,10-tetracarboxylic dianhydride
Cyclopentane-1,2,3,4-tetracarboxylic dianhydride
Pyrrolidine-2,3,5,5-tetracarboxylic dianhydride
Pyrazine-2,3,5,6-tetracarboxylic dianhydride
2,2-Bis-(2,5-dicarboxyphenyl)propane dianhydride
1,1-Bis-(2,3-dicarboxyphenyl)ethane dianhydride
Bis-(2,3 dicarboxyphenyl)methane dianhydride
Bis-(3,4-dicarboxyphenyl)methane dianhydride
Bis-(3,4-dicarboxyphenyl)sulfone dianhydride
Benzene-1,2,3,4-tetracarboxylic dianhydride
1,2,3,4-Butanetetracarboxylic dianhydride
Thiophene-2,3,4,5-tetracarboxylic dianhydride
3,3',4,4'-Diphenyltetracarboxylic dianhydride
3,4,3',4'-Benzophenonetetracarboxylic dianhydride
Azobenzenetetracarboxylic dianhydride
2,3,4,5-Tetrahydrofuran dianhydride
2-phenyl-4,6-bis(3',4'-dicarboxyphenyl)-s-triazine dianhydride
2-diphenylamino-4,6-bis(3',4'-dicarboxyphenyl)-s-triazine dianhydride Among the diprimary diamines which are suitable for preparing the resins of the present invention and also from which $R^1$ and $R^{10}$ are derived are those of the formula (IX):

$$H_2N\underset{}{\underbrace{(Z-(X-Z'-)_p-X)}_{p'}}Z-NH_2 \qquad (IX)$$

wherein X is nil, —O—, —CO—, —CH$_2$—, —S—, —SO$_2$, —NH—,

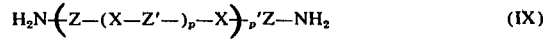

—S—S—, Z+Z' are alkyl, aryl, cycloalkyl or heterocyclic; and p+p' are 0, 1 or 2. These are illustrated by the following:
4,4'-Diamino-2,2'-sulfonediphenylmethane
Ethylenediamine
m-Phenylenediamine
p-Phenylenediamine
4,4'-Diaminodiphenylpropane
4,4'-Diaminodiphenylmethane
Benzidine
4,4'-Diaminodiphenyl sulfide
4,4'-Diaminodiphenylsulfone
3,3'-Diaminodiphenylsulfone
4,4'-Diaminodiphenyl ether 4,4'-Diaminobenzophenone
Bis-(4-aminophenyl)-N-methylamine
1,5-Diaminonaphthalene
3,3'-Dimethyl-4,4'-diaminobiphenyl
3,3'-Dimethoxybenzidine
Toluenediamine
Methylene bis(o-chloroaniline)
Methylene bis(o-methoxyaniline)
Methylene bis (o-methylaniline)
m-Xylylenediamine
p-Xylylenediamine
Bis-(4-aminocyclohexyl)-methane
Hexamethylenediamine
Heptamethylenediamine
Octamethylenediamine
Nonamethylenediamine
Decamethylenediamine
3-Methyl-heptamethylenediamine
4,4'-Dimethylheptamethylenediamine
2,11-diaminododecane
2,2-Dimethylpropylenediamine
3-Methoxyhexamethylenediamine
4,4'-(p-aminophenyl)disulfide
2,5-Dimethylhexamethylenediamine
2,5-Dimethylheptamethylenediamine
5-Methylnonamethylenediamine
1,4-Diaminocyclohexane
1,12-Diaminooctadecane
2,5-Diamino-1,3,4-oxadiazole
$H_2N(CH_2)_3O(CH_2)_2O(CH_2)_3NH_2$
$H_2N(CH_2)_3S(CH_2)_3NH_2$
$H_2N(CH_2)_3N(CH_3)(CH_2)_3NH_2$
2-diphenylamino-4,6-bis(m-aminoanilino)-s-triazine
2-amino-4,6-bis(m-aminoanilino)-s-triazine
2-phenyl-4,6-bis(p-aminophenyl)-s-triazine
2-phenyl-4,6-bis(m-aminophenyl)-s-triazine
2-phenyl-4,6-bis(4'-aminoanilino)-s-triazine
2-phenyl-4,6-bis(3'-aminoanilino)-s-triazine
2-anilino-4,6-bis(4'-aminoanilino)-s-triazine
2-(N-methylanilino)-4,6-bis(3'-aminoanilino)-s-triazine
2-dimethylamino-4,6-bis(3'-aminoanilino)-s-triazine
2-diphenylamino-4,6-bis(3'-aminoanilino)-s-triazine
2-diphenylamino-4,6-bis(4'-aminoanilino)-s-triazine
2-phenyl-4,6-bis(2'-methyl-4'-aminoanilino)-s-triazine
2-diphenylamino-4,6-bis(3'-aminocyclohexylamino)-s-triazine
2H,4,6-piperidino-4,6-bis(3'-aminoanilino)-s-triazine
2,4-bis(3'-aminoanilino)-s-triazine
2-amino-4,6-bis(3'-aminoanilino)-s-triazine
2-diphenylamino-4,6-bis[4-(p-aminophenoxy)anilino]-s-triazine The polyamide-acids of Formula II may be prepared by reacting, generally at between 20°C and 120°C in an anhydrous polar solvent such as tetrahydrofuran, dioxane, dimethylformamide, dimethylacetamide, dimethylsulfoxide, N-methylpyrollidone or pyridine, a dianhydride or mixture of two or more dianhydrides of formula VIII with a excess of a diprimary diamine or a mixture of two or more diprimary diamines.

The polyamide-amide-acids of formula IV may be prepared by reacting trimellitic anhydride or a derivative thereof, such as for example the acid chloride with an excess of a diprimary diamine or mixture of diprimary diamine and an anhydrous polar solvent such as dimethylformamide, N,N-dimethylacetamide, dimethylsulfoxide, N-methylpyrollidone, pyridine, tetrahydrofuran or dioxane.

The polyamide-amide acids of formula V may be prepared by reacting an amide dianhydride of the formula

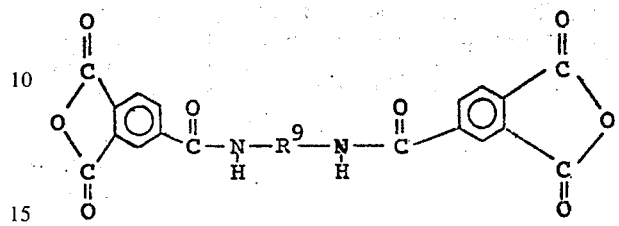

wherein $R^9$ is as defined hereinbefore, with a molar excess of a diprimary diamine in an anhydrous polar solvent such as dimethylformamide, dimethylacetamide, dimethylsulfoxide, N-methylpyrollidone.

The quantities of anhydride and diprimary diamine to prepare the amine terminated polymer resins are so chosen that the ratio $$\frac{\text{Number of Moles of Diamine}}{\text{Number of Moles of Anhydride}}$$

is in a range of from 2:1 to 1.01:1 more preferably from 2:1 to 1.1:1.

The polyamide-acid precursor resins of formulae II, III and IV have very good solubility in polar organic solvents such as Dimethylsulfoxide
N-methyl-2-pyrollidone
Tetramethyl urea
Pyridine
Dimethylsulfone
Hexamethylphosphoramide
Tetramethylene sulfone
Formamide
N-methylformamide
Butyrolactone
Dimethylformamide
Dimethylacetamide.
Dioxane
Tetrahydrofuran The solvents can be used alone, in combination with other solvents, or in combination with poor solvents such as benzene, benzonitrile, dioxane, xylene, toluene, cyclohexane, and methyl ethyl ketone.

Solutions may be prepared containing up to 50% by weight of the polyamide-acid precursor resins and flux additives combined. The resins and flux additives may be used directly from solution to form laminates, coatings for decorative and electrical purposes, films, and adhesives. The polyamide-acid precursors and the fluxes may be precipitated from their solutions by a dilutent such as water, a hydrocarbon or a ketone such as acetone. The powders thus obtained may be further processed using conventional plastic processing methods such as autoclave molding, vacuum bag molding, compression, transfer injection molding. Alternatively, the polyamide-acid resin precursors may be precipitated from solution and the flux additive blended with the resin powder after which the mixture is further processed.

The conversion of the polyamide acid precursors of formulae II, IV, and V into their corresponding polyimides of formula III and polyamide-imides of formulae VI and VII respectively may be affected by heating the precursor resins or their solutions between 80° and 200°C.

The fluxes may be added to the dry isolated powdered polyimides or the polyamide-imides by standard blending techniques and fabricated as discussed above. For those particular polyimides of formula III and the polyamide-imides of formulae VI and VII which are soluble in the aforementioned polar solvents, the additives may be added to a solution of imidized resin and the resin fabricated into laminates, coatings, adhesives, molding compositions, etc.

It may be desirable to heat a solution of the polyimide and flux additive from room temperature to 250°C. to increase solubility and solution stability. It may also be desirable to heat the neat blend of the polyimide or polyamide-imide and flux additive at 150°–250°C. for 5 minutes to two hours to increase solubility in low boiling solvents, e.g. solvents with a boiling point less than 150°C., and to decrease the melting point of the mixture. Heating the precursor resin and flux additive for a short time polymerizes the mixture to a slight extent, increasing the amorphous character of the resin and resulting in greater solubility and reduced melting points.

Amine terminated polybenzimidazoles processable in accordance with this invention are prepared by the following reaction:

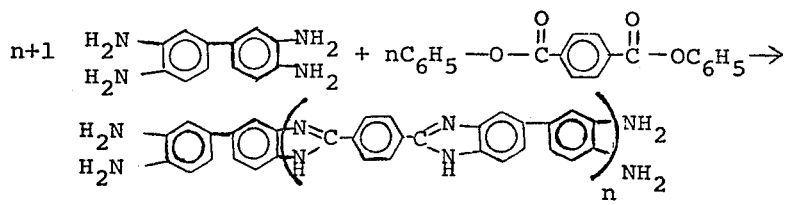

Amine terminated polypyrrones processable in accordance with this invention are prepared by the following reaction:

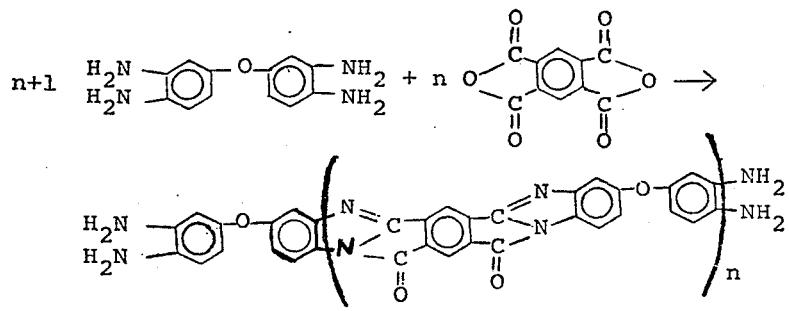

Amine terminated polythiadiazoles processable in accordance with this invention are prepared by the following reaction:

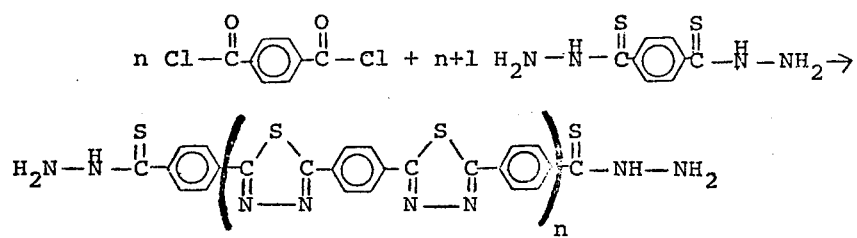

Amine terminated polyquinoxalines processable in accordance with this invention are prepared by the following reaction:

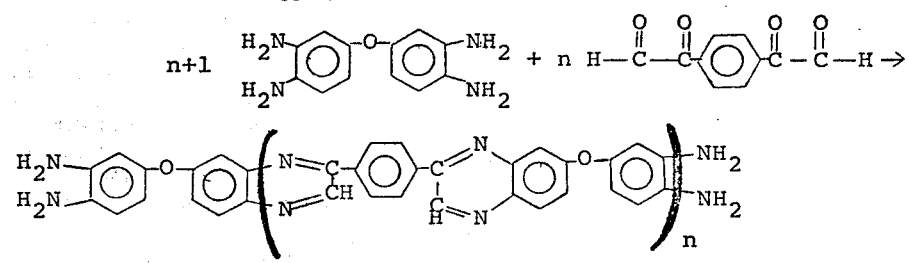

Amine terminated polybenzothiazoles processable in accordance with this invention are prepared by the following reaction:

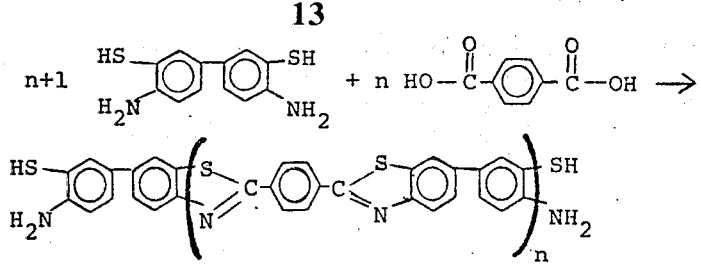

Amine terminated polyamides processable in accordance with this invention are prepared by the following reaction:

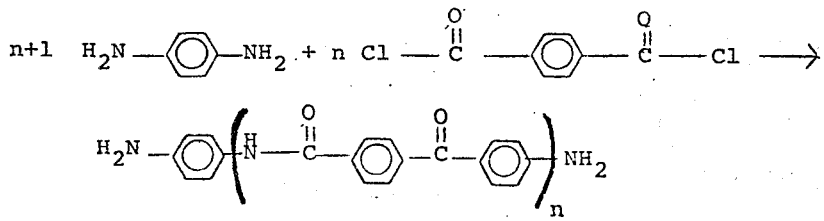

Amine terminated polyarylsulfones processable in accordance with this invention are prepared by the following reaction:

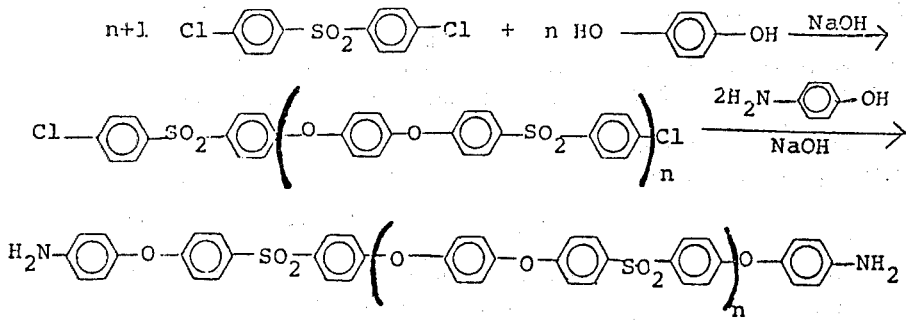

Amine terminated polyphenylenesulfides processable in accordance with this invention are prepared by the following reaction:

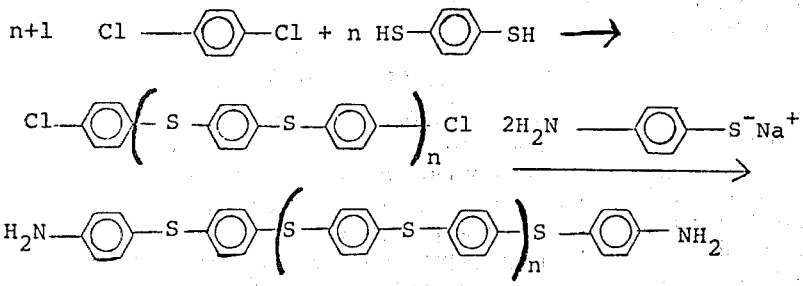

It should be apparent from the foregoing that any high temperature resin can be processed in accordance with this invention by providing terminal primary amine groups to the polymer molecules.

Other appropriate ingredients may be added to the compositions of this invention such as fillers, dyes, pigments, thermal and UV stabilizers and the like, depending on the end use.

The cyanamides described in this invention are reactive fluxes in the presence of amine terminated polyimides and other polymers mentioned above. Thus, they lower the melting and softening points of the high melting polyimides. Mixtures of cyanamide compounds and amine terminated polymers in stoichiometric or greater mole ratios melt or soften from 175°–300°C., enabling processing to occur in this temperature range. Also, the resulting polymers from said cyanamides and amine terminated polyimides have high $T_g$ values and excellent thermal stability at elevated temperatures (300°C.). Thus, the described resin compositions may be processed at relatively low temperatures and find utility where high temperature stability is required.

To further illustrate the nature of this invention and the process employed in preparing the chain extended and crosslinked resins, the following examples are given hereinbelow. For purposes of brevity the petter designations have been employed to indicate the compounds repeatedly used therein. These designations have the following meanings:

A. "DCP" — N,N'-Dicyanopiperazine
B. "TNCT" — Tris-(N-Cyanoanilino)-s-Triazine
C. "MDA" — 4,4'-Diaminodiphenylmethane
D. "BTDA" — 3,3', 4,4'-Benzophenonetetracarboxylic Dianhydrides E. "MOCA" — Methylene bis-(O-chloroaniline)
F. "ABG" — 3'-Aminobenzoguanamine
G. "AAAT" — 2-Amino-4,6-bix(m-aminoanilino)-s-triazine
H. "TMA" — Trimellic Anhydride

EXAMPLE 1

3 MDA:2 BTDA

To 295.9g (1.5 mole) of methylene dianiline (MDA) dissolved in 1350g of N-methylpyrrolidone (NMP) was added 322.2g (1.0 mole) of benzophenone tetracarboxylic acid dianhydride (BTDA) in three portions over a 30 minute period at room temperature. The reaction mixture was heated to 60°–70° to affect solution. This procedure results in the formation of the amine terminated amic acid (1A). Heating at 200° for 1 hour imidizes the prepolymer. While heating at 200° the prepolymer precipitated. After cooling, the mixture was poured into an equal volume of water. The solid was filtered, washed with water and dried under vacuum at 140°–160° to give 569g of product (1A').

EXAMPLE 2

3 MOCA:2 BTDA

To a solution of 561.0g (2.1 moles) of methylenebis-(-O-chloroaniline) (MOCA) in 1350g of DMF at room temperature was added 451g (1.4 moles) of BTDA in three portions over a 30 minute period. After solution was obtained, the reaction mixture was heated at 140°–150° for 3 hours. The resulting amine terminated polyimide remains in solution (2A) even after cooling to room temperature. It can be isolated by adding the DMF solution to 12 liters of water, filtering the solid and then drying at 150°C. for 48 hours under vacuum. Yield = 955g (2A')

EXAMPLE 3

3 MOCA:2 BTDA

To 12.0g (0.045 mole) of MOCA dissolved in 40g of THF was added 0.66g (0.30 mole) of BTDA in three portions over a 15 minute period at room temperature. After stirring the solution for 24 hours at room temperature, the THF was removed using a Rinco evaporator. The residual amine terminated amic acid powder was imidized by heating in an oven at 200° for 2 hours.

EXAMPLE 4

2 ABG:BTDA

To 2.02g (0.01 mole) of 3-aminobenzoguanamine (ABG) dissolved in 15g of NMP at 110° was added 1.61g (0.005 mole) of BTDA in 2 portions over a 10 minute period. After stirring for 24 hours at room temperature, the solution was heated at 200° for 1 hour. On cooling to room temperature, the imidized prepolymer precipitated. The mixture was poured into water, and the resulting solid filtered, washed with water and dried.

EXAMPLE 5

2 ABG:MDA:2 BTDA

To a solution of 49.3g (0.25 mole) of MDA in 600g of NMP was added 101.1g (0.50 mole) of ABG. The mixture was heated to 110° to affect solution. To this solution was added 161.1g (0.50 mole) of BTDA in three portions over a 30 minute period. This process yields the benzoguanamine terminated amic acid (5a).

Heating the amic acid at 200° for 1 hour imidizes the prepolymer. The benzoguanamine terminated, imidized prepolymer precipitates from solution. It is isolated by adding water, filtering and drying in an oven at 180°–200° for 48 hours (5b).

EXAMPLE 6

2 ABG:MOCA:2 BTDA

To a solution of 5.34g (0.02 mole) of MOCA and 8.09g (0.04 mole) of ABG in 48g of NMP at 120° was added 12.89g (0.04 mole) of BTDA. After solution was obtained, the reaction mixture was heated to 200° for 1 hour. On cooling, the reaction mixture was poured into water. The imidized prepolymer was isolated by filtering the solid and drying at 180°–200° for 24 hours under vacuum. Yield = 24.5g (5a).

EXAMPLE 7

2 ABG:DPAAT:2 BTDA

To 0.04 mole of ABG and 0.02 mole of DPAAT in 50g of DMF at room temperature was added 0.04 mole of BTDA in three portions. After solution the product was the benzoguanamine terminated amic acid.

EXAMPLE 8

2 ABG:2 MDA:2 BTDA

Using 0.02 mole of ABG, 0.02 moles of MDA and 0.03 mole of BTDA in 33g of DMF, the benzoguaniamine terminated amic acid was prepared.

9

2 ABG:2 MOCA:3 BTDA

To a solution of 0.50 mole of MOCA and 0.50 mole of ABG in 865g of DMF was added 0.75 mole of BTDA in four portions over a 20 minutre period. The mixture was heated at reflux for 3 hours. This procedure results in a soluble, benzoguanamine terminated polyimide (9a).

The imidized prepolymer can be isolated by precipitation with water, filtering and then drying the solid at 160°–200° for 24 hours (9b).

EXAMPLE 10

2 ABG:2 DPAAT:2 BTDA

To a solution of 0.02 mole of DPAAT and 0.02 mole of ABG at 100° in 50g of NMP was added 0.03 mole of BTDA in 3 portions over a 15 minute period. Subsequent heating at 200° for 1 hour gave a soluble, imidized prepolymer (10a).

The prepolymer could be isolated in the usual way by precipitation with water followed by drying at 180°–200° (10b)

EXAMPLE 11

3 DPAAT:2 BTDA

To a solution of 20.5g (0.0375 mole) of DPAAT (complexed with one mole of dioxane) in 75g of NMP was added 8.05g (0.025 mole) of BTDA in three portions over a 25 minute period. The reaction was stirred at room temperature for 3 hour and then heated at 200° for 1 hour. Cooling to room temperature gave an NMP solution to the amine terminated polyimide (11a).

EXAMPLE 12

2 DPAAT:AAAT:2 BTDA

To a solution of 0.02 mole of DPAAT and 0.01 mole of AAAT in 60g of NMP was added 0.02 mole of BTDA in three portions over a 25 minute period. After stirring at room temperature overnight, the prepolymer was heated at 200° for 1 hour to give the amine terminated polyimide (12a).

EXAMPLE 13

3 MDA:2 BTDA + 2 DCP

1. Film

To a solution of 0.01 mole of the amine terminated amic acid (1A) from MDA and BTDA was added 0.02 mole of DCP. A film was obtained by coating the solution on aluminum and then curing the resin system from room temperature to 300°C. for 1 hour followed by holding the temperature at 300° for 1 hour.

2. Molding Powder

The amine terminated polyimide from 3 MDA:2 BTDA (1A) was blended with 2 moles of DCP. This mixture was then blended with 50% powdered quartz and press molded at 450°F (232°C) and 550°F (288°C) to give ¼ inch plaques. The results are summarized in the following table.

Results of Press Molding
50% Powdered Quartz Filled - ¼" Thick

| | 3 MDA:2 BTDA + 2 DCP | |
|---|---|---|
| Molding Conditions | | |
| Temp. °C | 288 | 232 |
| Pressure, psi | 3000 | 3000 |
| Time, min. | 20 | 60 |
| Flexural Strength, Kpsi | | |
| Room Temp. | 14.5 | 8.6 |
| 450°F (232°C) | — | 5.2 |
| 550°F (288°C) | 6.1 | — |
| Flexural Modulus, Mpsi | | |
| Room Temp. | 1.41 | 1.59 |
| 450°F | — | 0.78 |
| 550°F | 0.51 | — |
| Post Cure Conditions: | room temperature to 305°C over a 24-hour period | |
| Flexural Strength, Kpsi | | |
| Room Temp. | | 8.1 |
| 550°F | | 5.2 |
| Flexural Modulus, Mpsi | | |
| Room Temp | | 1.60 |
| 550°F | | 0.70 |

EXAMPLE 14

3 MDA:2 BTDA + TNCT

1. Film

A DMF solution of the amine terminated amic acid from 3 MDA:2 BTDA and TNCT in a mole ratio of 3:2 was coated on aluminum. Curing as indicated in Example 13(1) gave a coherent film.

2. Molding

The amine terminated polyimide from 3 MDA:2 BTDA was blended with 2 moles of TNCT. This mixture was blended with 50% quartz and then press molded at 550°F/3000 psi for 1 hour to give a well-consolidated, hard ¼ inch plaque.

EXAMPLE 15

3 MOCA:2 BTDA + DCP

1. Laminating Resin

A blend of the amine terminated 3 MOCA:2 BTDA polyimide, (2A') and 1 mole of DCP was heated at 200° for 2 hours. The powder was dissolved to 50 weight percent in a solvent mixture of 9 parts MEK to 1 part DMF by weight. The resulting varnish was used to prepreg 181E Glass Cloth. (A1100 Finish). The prepreg was cut into 6 inch × 6 inch plies. A 12 ply laminate was prepared by B-staging at 400°F. for 1 hour followed by supplying 90 psi at 400°F. for 3 hours.

| Temp. | Flex. Strength | Flex. Modulus | Short Beam Shear |
|---|---|---|---|
| R.T. | 34,800 psi | 2.87 × 10⁶ psi | 1531 psi |

The laminate was postcured over a 24 hour period from room temperature to 300°C.

| Temp. | Flex. Strength | Flex. Modulus | Short Beam Shear |
|---|---|---|---|
| R.T. | 70,300 psi | 3.00 × 10⁶ psi | 5697 psi |
| 550°F. | 53,400 | 2.56 × 10⁶ | 3122 |

2. Molding Powder

Equimolar amounts of 3 MOCA:2 BTDA imidized powder and DCP were blended together. The resulting mixture was blended with 50% powdered quartz and press molded at 450°F./3000 psi for 1 hour to give a well consolidated ¼ inch plaque.

3. Film

A 50 weight percent solution of equimolar amounts of 3 MOCA:2 BTDA amine terminated polyimide and DCP in DMF was coated on aluminum sheet. Curing in the usual way (Example 14) gave a coherent film.

EXAMPLE 16

2 ABG:MDA:2 BTDA + DCP

1. Laminating Resin

To a solution of the benzoguanamine terminated amic acid (Example 5a) and DCP in a mole ratio of 1:2 respectively was prepared at 33 weight percent in NMP. The solution was used to prepreg 181E Glass Cloth (A1100 Finish) via a double dip procedure. The resin content on the glass was 34%. A 12 ply 6 inch × 6 inch laminate was prepared at 400°F./90 psi for 1 hour.

2. Film

An NMP solution of the amic acid and DCP was coated on aluminum and cured in the usual way to give a coherent film.

3. Molding Powder

The imidized benzoguanamine prepolymer (Example 5b) was blended with 2 moles of DCP. This mixture was blended further with 50% powdered quartz and press molded at 450°F./3000 psi for 1 hour to give a ¼ inch plaque.

| Temp. | Flexural Modulus | Flexural Strength |
|---|---|---|
| R.T. | 1.66 × 10⁶ psi | 6020 psi |

-continued

| Temp. | Flexural Modulus | ]Flexural Strength |
|---|---|---|
| 450°F. | $0.91 \times 10^6$ psi | 3790 psi |

EXAMPLE 17

2 ABG:2 MOCA:3 BTDA + 3 DCP

1. Laminating Resin

To a mole of the benzoguanamine terminated polyimide in DMF (Example 9a) was added three moles of DCP. The solution was refluxed for 2 hours to give a 42% weight percent varnish. A prepreg was prepared from this varnish and 181E Glass Cloth having 30% resin. A 12 ply 6 inch × 6 inch laminate was obtained by applying 90 psi at 400°F. for 3 hours.

| Temp. | Flex. Strength | Flex. Modulus | Short Beam Shear |
|---|---|---|---|
| Room Temp. | 24,600 psi | $2.58 \times 10^6$ psi | 1908 psi |

The laminate was postcured from room temperature to 300°C. over a 24 hour period.

|  | Flex. Strength | Flex. Modulus | Short Beam Shear |
|---|---|---|---|
| Room Temp. | 66,500 psi | $2.17 \times 10^6$ psi | 4866 psi |
| 550°F. | 42,100 | $2.21 \times 10^6$ | 3409 |

2. Molding Powder

The amine terminated polyimide powder (Example 10) was blended with three moles of DCP. Further blending with 50% powdered quartz gave a material which was pressed molded at 400°F. and at 450°F. for 1 hour at 3000 psi. In both runs well consolidate ¼ inch plaques were obtained.

3. Film

A film was obtained by coating a DMF solution of the prepolymer and DCP on aluminum and curing as previously described.

EXAMPLE 18

2 ABG:BTDA + DCP

A mixture of the 2 ABG:BTDA imide and DCP in a mole ratio of 1:2 respectively melted at 165° and cured to a hard glassy material.

EXAMPLE 19

2 ABG:BTDA + TNCT

A mixture of the 2 ABG:BTDA imide and TNCT in a mole ratio of 3:4 respectively melted at 200°–210° and then cured to a glassy material at 210°–215° in 30 minutes.

EXAMPLE 20

2 ABG:MOCA:2 BTDA + DCP

A mixture of the benzoguanamine terminated polyimide (Example 6) and DCP in a mole ratio of 1:2 respectively melted and then cured in 7 minutes at 260°C. to a hard glassy material

EXAMPLE 21

2 ABG:MOCA:2 BTDA + TNCT

A mixture of the polyimide and TNCT in a mole ratio of 3:4 respectively melted and cured in 3 minutes at 260°C.

EXAMPLE 22

2 ABG:2 DPAAT:3 BTDA + DCP

The benzoguanamine terminated polyimide (Example 10b) and DCP in a mole ratio of 1:3 respectively were dry blended. The mixture melted at 160°–170° and cured in 1 hour 50 minutes at 200° to a hard glassy product.

EXAMPLE 23

2 DPAAT:AAAT:2 BTDA + DCP

An NMP solution of the amine terminatd polyimide (Example 12) and DCP in a mole ratio of 1:2 was coated on aluminum. Curing from room temperature to 250° over a 35 minute period followed by 1 hour at 250° gave a coherent film. Another run using 3 moles of DCP and 1 mole of prepolymer gave the same result.

EXAMPLE 24

3 DPAAT:2 BTDA + DCP

A film was prepared from the amine terminated polyimide (Example 11) and 1 mole of DCP by curing from room temperature to 300°C. over a 1 hour period followed by 1 hour at 300°.

EXAMPLE 25

Effect of DCP and TNCT

| On the Softening Points of Prepolymers | | | |
|---|---|---|---|
|  | Prepolymer Alone (Imidized) | 3 Prepolymer + 4 TNCT | Prepolymer + 2 DCP |
| 2 ABG:MDA:2 BTDA | 265°C. | 210° | 155 |
| 2 ABG:MOCA:2 BTDA | 255 | 220 | 160 |
| 2 ABG:DPAAT:2 BTDA | 265 | 210 | 160 |
| 2 ABG:2 MOCA:3 BTDA | 265 | — | 175–185 |
|  |  |  | 170–180 |
|  |  |  | (3 moles of DCP) |
| 2 ABG:2 DPAAT:3 BTDA | 280–290 | — | 160–170 |
|  |  |  | (3 moles of DCP) |
| 3 MOCA:2 BTDA | 285 | — | 170–185 |
|  |  |  | (1 mole of DCP) |

EXAMPLE 26

Tg's of Prepolymers Cured with Cyanimides

| Resin | Tg |
|---|---|
| 2 ABG:MDA:2 BTDA + 2 DCP | 330° |
| 2 ABG:2 MOCA:2 BTDA + 3 DCP | >350 |
| 3 MOCA:2 BTDA + DCP | 345 |
| 3 MDA:2 BTDA + 2 DCP | 350 |
| 3(3 MDA:2 BTDA) + 2 TNCT | 310 |
| 3 DPAAT:2 BTDA + DCP | 330 |
| 3 (DPAAT:2 BTDA) + 2 TNCT | 305 |
| 2 DPAAT:AAAT:2 BTDA + 2 DCP | 343 |
| 3 (2 ABG:DPAAT: 2 BTDA) + 4 TNCT | 320 |

EXAMPLE 27

3 MDA:2 TMA

To 1.5 moles of MDA dissolved in 1300g of DMF was added 1.0 mole of trimellitic anhydride acid chloride in three portions over a 30-minute period at room temperature. The reaction mixture was stirred overnight at room temperature. This procedure results in the formation of the amine terminated polyamide amic acid (27A). The amine terminated polyamide amic acid is isolated by pouring the DMF solution (28A) into 10 times its volume of 5%. aqueous sodium hydroxide and filtering the solid. Heating the solid at 200°C. for 3 hours gives the amine terminated polyamide-imide (27B).

EXAMPLE 28

Molding Powder

The amine terminated polyamide-imide (27B) is blended with 2 moles of DCP. This mixture is then blended with 50g. powdered quartz and press molded at 550°F/3000psi for 1 hour to give a well-consolidated hard ¼ inch plaque.

EXAMPLE 29

Amine Terminated Polyquinoxaline Polymer (3TADE:2 PDG)

To 0.30 mole of 3,3',4,4' tetraminodiphenyl ether (TADE) in 200 ml. of hexamethylphosphoramide is added in portions at room temperature 0.20 moles of p-phenylene diglyoxal dihydrate (PDG). The reaction mixture is heated to 200° C. over a 2 hour period followed by heating at 200°C. for 3 hours. This procedure gives the solution of the amine terminated polyquinoxaline polymer (29A).

To the amine terminated prepolymer solution (29A) is added 0.20 moles of N,N'-dicyanopiperazine. A film is obtained by casting the solution on aluminum and then curing from room temperature to 300°C. over a 1-hour period followed by holding the temperature at 300°C. for 1 hour.

What is claimed is:

1. A heat curable composition of matter capable of yielding a highly crosslinked, chain extended high temperature stable resin comprising:
   a. A prepolymer resin selected from a primary amine terminated polyimide, polyamide-imide, polyamide acid, polyamide-amide acid, polybenzimidazole, polypyrrone, polythiadiazole, polyquinoxaline, polybenzothiazole, polyamide, polyarylsulfone, and polyphenylenesulfide, and
   b. about 0.5 to 5.0 mole equivalents per mole of (a) of a cyanamide of a polyfunctional secondary amine.

2. The composition of claim 1 comprising a stoichiometric excess of (b).

3. The composition of claim 1 wherein (b) is a cyanamide of a difunctional secondary amine.

4. The composition of claim 1 wherein (b) is N,N'-dicyanopiperazine.

5. The composition of claim 1 wherein (b) is tris-(N-cyanoanilino)-s-triazine.

6. The composition of claim 1 wherein (b) is represented by the formula:

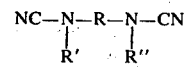

wherein R is an alkylene, arylene or heterocyclic group; and R' and R'' are individually aryl, alkyl, heterocyclic or together with —N—R—N— a heterocyclic ring.

7. The composition of claim 1 wherein (a) is an amine terminated polyamide acid.

8. The composition of claim 1 wherein (a) is an amine terminated polyamide-amide acid.

9. The composition of claim 1 wherein (a) is an amine terminated polyimide.

10. The composition of claim 1 wherein (a) is an amine terminated polyamide-imide.

11. A composition according to claim 1 wherein (a) is a polyimide resin having the formula:

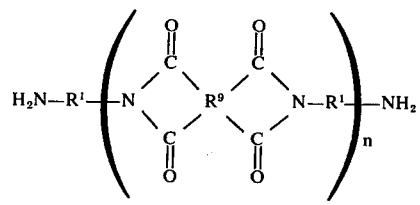

or a polyamide-imide resin having the formulae v,

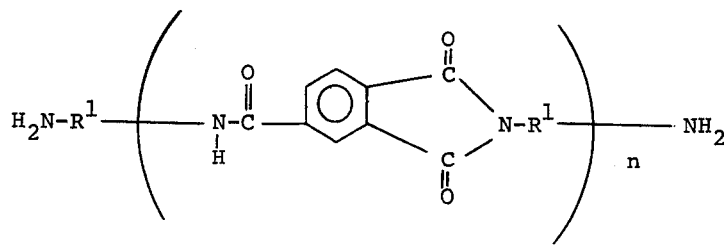

and

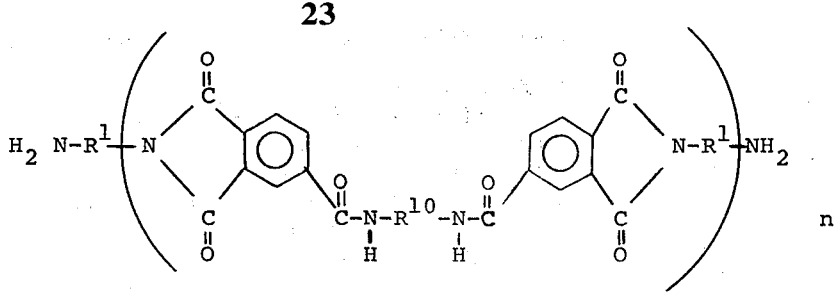

wherein
- R⁹ is a tetravalent aliphatic radical, cycloaliphatic radical, a heterocyclic radical containing at least one of the atoms of O, N and S, or an aromatic group containing at least one ring of six carbon atoms;
- $R^1$ and $R^{10}$ are the same or different and each is an alkylene group containing from 2 to 12 carbon atoms; a cycloalkylene group containing from 4 to 6 carbon atoms; an arylene group or a heterocyclic group; n is an integer of from 1–100.

12. A solution of a composition according to claim 1 in a volatile organic solvent for said composition.

13. A molding powder comprising the composition according to claim 1.

14. A polymeric composition comprising a chain extended, highly crosslinked polymer produced by heat curing at 150° to 350° C the composition of claim 1.

15. The composition of claim 1 wherein (a) is a prepolymer resin from 3 moles of 4,4'-diaminodiphenylmethane and 2 moles of 3,3',4,4'-benzophenonetetracarboxylic dianhydride and (b) contains 2 moles of N,N'-dicyanopiperazine.

16. The composition of claim 1 wherein (a) is a prepolymer resin from 3 moles of methylene bis-(o-chloroaniline) and 2 moles of 3,3',4,4'-benzophenonetetracarboxylic dianhydride and (b) is 1 mole of N,N'-dicyanopiperazine.

17. The composition of claim 1 wherein (a) is 3 moles of a prepolymer resin from 3 moles of 4,4'-diaminodiphenylmethane and 2 moles of 3,3',4,4'-benzophenonetetracarboxylic dianhydride and (b) is 2 moles of tris (N-cyanoanilino)-s-triazine.

18. The composition of claim 1 wherein (a) is a prepolymer resin from 2 moles of 3'-aminobenzoquanamine, 1 mole of 4,4'-diaminodiphenylmethane and 2 moles of 3,3',4,4'-benzophenonetetracarboxylic dianhydride and (b) is 2 moles of N,N'-dicyanopiperazine.

19. The composition of claim 1 wherein (a) is a prepolymer from 2 moles of 3'-aminobenzequanine, 2 moles of methylene bis-(o-chloroaniline) and 2 moles of 3,3',4,4'-benzophenonetetracarboxylic dianhydride and (b) is 3 moles of N,N' dicyanopiperazine.

20. The composition of claim 1 wherein (a) is 3 moles of a prepolymer resin from 2 moles of 3'-aminobenzoquanamine, 1 mole of methylene bis-(o-chloroaniline) and 2 moles of 3,3',4,4'-benzophenonetetracarboxylic dianhydride and (b) is 4 moles of tris-(N-cyanoanilino)-s-triazine.

21. The composition of claim 1 wherein (a) is a prepolymer resin from 2 moles of trimellitic anhydride acid chloride and 3 moles of 4,4'-diaminodiphenylmethane and (b) is 2 moles of N,N'-dicyanopiperazine.

* * * * *